US008624976B2

United States Patent
Nyström

(10) Patent No.: US 8,624,976 B2
(45) Date of Patent: Jan. 7, 2014

(54) SUPPORTING CONTINUOUS PAN ROTATION IN A PAN-TILT CAMERA

(75) Inventor: Johan Nyström, Malmö (SE)

(73) Assignee: Axis AB, Lund (SE)

( * ) Notice: Subject to any disclaimer, the term of this patent is extended or adjusted under 35 U.S.C. 154(b) by 1050 days.

(21) Appl. No.: 12/099,019

(22) Filed: Apr. 7, 2008

(65) Prior Publication Data

US 2008/0259159 A1    Oct. 23, 2008

Related U.S. Application Data

(60) Provisional application No. 60/912,263, filed on Apr. 17, 2007.

(30) Foreign Application Priority Data

Apr. 13, 2007   (EP) ..................................... 07106105

(51) Int. Cl.
*H04N 7/18*    (2006.01)

(52) U.S. Cl.
USPC ........................................................ 348/143

(58) Field of Classification Search
USPC ............................................... 348/143, 208.7
See application file for complete search history.

(56) References Cited

U.S. PATENT DOCUMENTS

| | | | |
|---|---|---|---|
| 4,890,713 A * | 1/1990 | Pagano ..................... 192/142 R |
| 5,627,616 A | 5/1997 | Sergeant et al. | |
| 6,027,257 A | 2/2000 | Richards et al. | |
| 6,392,693 B1 | 5/2002 | Wakiyama et al. | |
| 6,714,236 B1 * | 3/2004 | Wada et al. .................... 348/152 |
| 6,715,940 B2 | 4/2004 | Top et al. | |
| 6,771,306 B2 * | 8/2004 | Trajkovic et al. ............. 348/170 |
| 7,151,558 B1 | 12/2006 | Kogane et al. | |

(Continued)

FOREIGN PATENT DOCUMENTS

EP    0 933 742    8/1999
EP    0933742 A1    8/1999

(Continued)

OTHER PUBLICATIONS

Ernitec, "Orion Colour-Mono Dome Camera", (Published on May 2, 2005, Downloaded on Mar. 2, 2007).

(Continued)

*Primary Examiner* — Glenton B Burgess
*Assistant Examiner* — Benjamin Ailes
(74) *Attorney, Agent, or Firm* — Volpe and Koenig, P.C.

(57) ABSTRACT

The invention relates to a method for moving a maneuverable part of a pan-tilt camera from a first pan-tilt position, having a first pan coordinate and a first tilt coordinate, to a second pan-tilt position, having a second pan coordinate and a second tilt coordinate. The maneuverable part is moved by inverting the maneuverable part of the camera and panning to the second pan coordinate. The first pan coordinate is part of a pan-tilt coordinate system and the second pan coordinate is part of a complementary pan-tilt coordinate system, which represents positions of the inverted maneuverable part. The maneuverable part is moved from the first tilt coordinate to the second tilt coordinate. The first tilt coordinate is part of the pan-tilt coordinate system and the second tilt coordinate is part of the complementary pan-tilt coordinate system. The invention also relates to a corresponding device and a corresponding computer program.

23 Claims, 4 Drawing Sheets

(56) References Cited

U.S. PATENT DOCUMENTS

| | | | |
|---|---|---|---|
| 7,479,979 B2 * | 1/2009 | Kakou et al. | 348/143 |
| 7,643,066 B2 * | 1/2010 | Henninger et al. | 348/211.99 |
| 8,200,078 B2 * | 6/2012 | Dumm | 396/58 |
| 8,228,377 B2 * | 7/2012 | Chardon et al. | 348/143 |
| 2004/0021785 A1 | 2/2004 | Pshtissky et al. | |
| 2004/0047623 A1 * | 3/2004 | Top et al. | 396/427 |
| 2006/0055777 A1 * | 3/2006 | Ito et al. | 348/143 |
| 2007/0115355 A1 * | 5/2007 | McCormack | 348/143 |
| 2008/0204560 A1 * | 8/2008 | Nilsson | 348/187 |

FOREIGN PATENT DOCUMENTS

| | | |
|---|---|---|
| JP | 02-282881 | 11/1990 |
| JP | 4120889 | 4/1992 |
| JP | 2004-056239 | 2/2004 |
| JP | 2004088558 | 3/2004 |
| JP | 2005130007 A | 5/2005 |
| JP | 2005303492 A | 10/2005 |
| JP | 2005323187 A | 11/2005 |
| JP | 2006121584 | 5/2006 |
| JP | 2007028010 A | 2/2007 |
| WO | 95/35624 | 12/1995 |
| WO | 01/99404 | 12/2001 |

OTHER PUBLICATIONS

Ernitec, "Saturn 5' Dome Camera", (Published on Nov. 16, 2005, Downloaded on Mar. 2, 2007).

Eyeview Electronics Co., LTD., "Tpower High Speed Dome Camera", (2002).

Sony, "Colour Block Cameras FCB-EX Series", (Published on Sep. 20, 2004, Downloaded on Feb. 5, 2007).

Stechele et al., "A Coprocessor for Accelerating Visual Information Processing", Proceedings of the Design, Automation and Test in Europe Conference and Exhibition (Date'05), vol. 3, pp. 26-31, (Mar. 7-11, 2005).

* cited by examiner

SUPPORTING CONTINUOUS PAN ROTATION IN A PAN-TILT CAMERA

FIELD OF INVENTION

The present invention relates to a method for moving a maneuverable part of a pan-tilt camera from a first pan-tilt position, having a first pan coordinate and a first tilt coordinate, to a second pan-tilt position having a second pan coordinate and a second tilt coordinate. The present invention also relates to a corresponding computer program product according and to a corresponding storage medium.

BACKGROUND

The present invention is intended for use in connection with pan-tilt-zoom (PTZ) cameras. PTZ cameras and dome cameras are two of the most common camera types used in various types of surveillance applications. Both types of cameras can move in various directions, and are typically controlled by a computer system that receives input from a user using some kind of control device, such as a joystick, while viewing the captured images on a display.

Panning is defined as movement in a horizontal plane of the camera, and tilting is defined as movement in a vertical plane of the camera, respectively. There are three main types of movement models that can be used to describe how to move the camera from a first position to a second position: absolute movement, relative movement, and continuous movement. In the absolute movement model, the new position of the camera is described by a destination position in a fixed pan/tilt coordinate system (e.g., "Pan to 36.25 degrees and tilt to −20.70 degrees"). The user input is typically generated by a user entering coordinates for the new position as numbers. In the relative movement model, the new position of the camera is described as pan and tilt distance offsets from the current camera position in the a fixed pan/tilt coordinate system (e.g., "Pan left 2.50 degrees and tilt up 6.45 degrees"). The user input is typically generated by a user clicking with a mouse (or a similar pointing device) in a displayed image to select a point to which the user wishes to redirect the camera. In the continuous movement model, the new position of the camera is described as a direction and a speed (i.e., a vector) and will continue until another movement command is issued (e.g., Pan right at 10.50 degrees/second and tilt down at 5.25 degrees/second). The continuous movement model is the classical "joystick control" used by most manual operators.

A dome camera, which is typically mounted on the ceiling in a building, has unlimited pan (i.e., the dome camera can perform an unlimited number of 360-degree rotations in the pan plane), and can typically tilt 180 degrees, thereby covering a complete semi-sphere. When the dome camera tilts past nadir (i.e., the point straight below the camera), the camera will be upside down. In order to display a right-side-up image to the user, the image captured by the dome camera is automatically flipped (i.e., rotated 180 degrees).

A PTZ camera, on the other hand, typically has a pan range of +/−170 degrees (that is, less than 360 degrees total pan range), and a tilt that varies, typically from 0 to −90 degrees, or from 0 to −180 degrees. These restrictions are due to mechanical limitations caused by, for example, power and data cables that connect the maneuverable part of the PTZ camera with the stationary part of the PTZ camera. FIG. 1 shows a schematic view of a PTZ camera 100 having a stationary element 120 and a maneuverable element 130 to which a camera block 140 is attached. The stationary element 120 has a mechanical stop 110, which physically engages with a mechanical stop 150 on the maneuverable element 130 to limit the movement of the maneuverable element 130.

U.S. Pat. No. 6,392,693 describes an example of a monitoring camera that has an automatic pivoting function when the camera reaches a predetermined position. When the camera reaches the predetermined position, the camera automatically pivots to a different position which can be set by a user. The document describes an application in which the camera monitors a walkway between two doors and can be used to follow people walking from the first door to the second door. When the second door is reached, i.e., the predetermined position, the camera automatically returns to the original position where it monitors the first door. The image displayed to the user freezes during the transition from the predetermined camera position to the original position. Various embodiments also provide for enabling or disabling the automatic pivoting function. Since the monitoring camera used in this document is a PTZ camera, it suffers from the same problems that were discussed above. That is, even if the camera can cover the walkway, as described in the exemplary embodiment, the camera lacks a 360 degree continuous panning capability and a 180 degree tilting capability, which gives limited viewing abilities to the camera operator.

SUMMARY

The invention relates to a method for moving a maneuverable part of a pan-tilt camera from a first pan-tilt position, having a first pan position and a first tilt position, to a second pan-tilt position, having a second pan position and a second tilt position, the maneuverable part being configured to pan in a geometric pan plane. The method includes identifying a position of a mechanical pan stop. The method also includes moving the maneuverable part from the first pan position to the second pan position by inverting the maneuverable part of the camera by tilting the maneuverable part passing a normal of the geometric pan plane, and panning to the second pan position. The first pan position is part of a pan-tilt coordinate system and the second pan position is part of a complementary pan-tilt coordinate system representing positions of the inverted maneuverable part.

The invention also relates to a computer program for moving a maneuverable part of a pan-tilt camera from a first pan-tilt position, having a first pan position and a first tilt position, to a second pan-tilt position, having a second pan position and a second tilt position. The method includes identifying a position of a mechanical pan stop. The method also includes moving the maneuverable part from the first pan position to the second pan position, by inverting the maneuverable part of the camera and panning to the second pan position. The first pan position is part of a pan-tilt coordinate system and the second pan position is part of a complementary pan-tilt coordinate system representing positions of the inverted maneuverable part.

The invention further relates to a digital storage medium comprising such a computer program.

The invention further relates to a pan-tilt camera including a stationary part, a maneuverable part configured to pan in a geometric pan plane, a mechanical stop connected to the stationary part, and a processor configured to identify a position of the mechanical pan stop; and move the maneuverable part from a first pan position to a second pan position, by inverting the maneuverable part of the camera by passing a normal of the geometric pan plane, and panning to the second pan position. The first pan position is part of a pan-tilt coordinate system and the second pan position is part of a complementary pan-tilt coordinate system representing positions of the inverted maneuverable part.

BRIEF DESCRIPTION OF THE DRAWINGS

Like reference symbols in the various drawings indicate like elements.

DETAILED DESCRIPTION OF THE PREFERRED EMBODIMENTS

Introduction to the Embodiments

Figure 1:
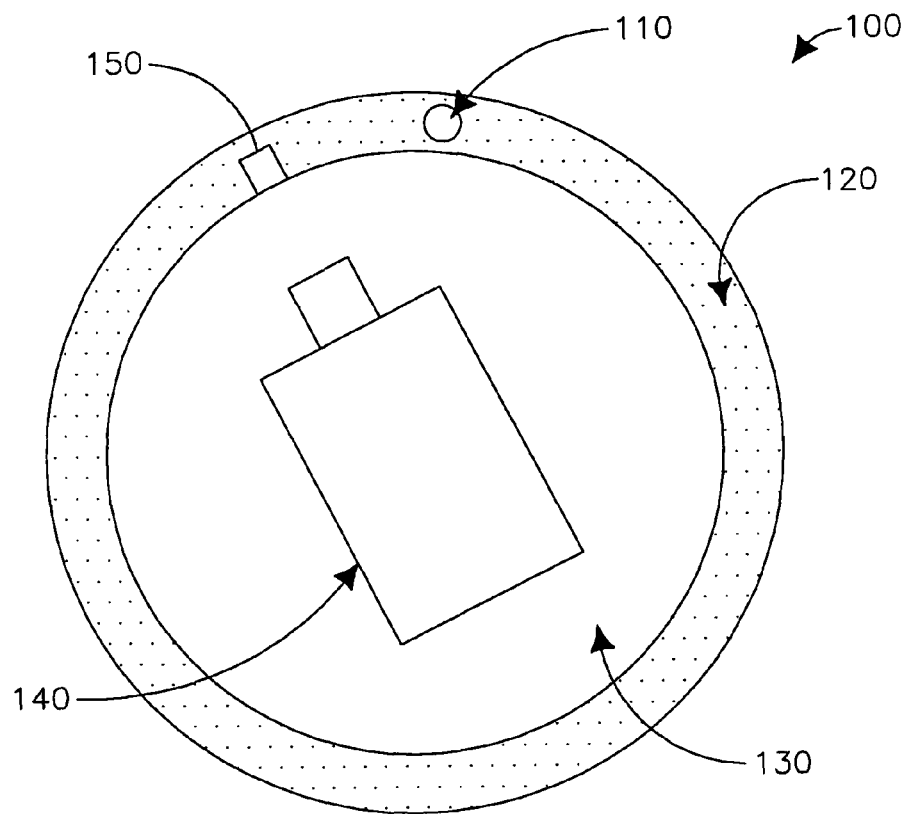
FIG. 1 shows a schematic view of a PTZ camera in accordance with one embodiment of the invention.

According to a first aspect, the invention relates to a method for moving a maneuverable part of a pan-tilt camera from a first pan-tilt position, having a first pan position and a first tilt position, to a second pan-tilt position, having a second pan position and a second tilt position, the maneuverable part being configured to pan in a geometric pan plane. The method is characterized by the steps of:
  identifying a position of a mechanical pan stop; and
  moving the maneuverable part from the first pan position to the second pan position, by inverting the maneuverable part of the camera by tilting the maneuverable part 140 passing a normal of said geometric pan plane, and panning to the second pan position, wherein the first pan position is part of a pan-tilt coordinate system and the second pan position is part of a complementary pan-tilt coordinate system representing positions of the inverted maneuverable part.

This provides a 360 degree continuous panning capability for pan-tilt cameras that have mechanical pan stops. As a result, a user using a joystick does not need to know the position of the pan stop.

The complementary coordinates used by the system internally are exported into the upright coordinate space before being presented to the user. As a result, the user will always see upright coordinates, to which he is accustomed, and does not need to be aware of what types of coordinates are used internally by the pan-tilt camera to represent various camera positions.

In one embodiment the method further comprises moving the maneuverable part from the first tilt position to the second tilt position. Moreover the movement from towards the second pan and tilt positions may be performed substantially simultaneously. By performing pan and tilt substantially simultaneously it is possible to reposition the maneuverable part faster than if tilt and pan were performed individually.

In one embodiment the step of inverting may comprise passing the normal of the geometric pan plane once.

In one embodiment, an image is captured by the pan-tilt camera. The image is frozen while moving the maneuverable part from the first pan-tilt position to the second pan-tilt position, and the image is unfrozen in response to reaching the second pan-tilt position. As a result, the user of the pan-tilt camera experiences the camera as having 360 degree panning capability, with the captured image briefly freezing for a short moment.

In one embodiment, the first pan-tilt position is the position of the identified mechanical pan stop and identifying the position of the mechanical pan stop includes physically encountering the mechanical pan stop during a continuous movement of the maneuverable part of the pan-tilt camera. In another embodiment, identifying the position of the mechanical pan stop includes determining that the position of the mechanical pan stop is located in a path to be used by the maneuverable part of the pan-tilt camera when moving from the first pan-tilt position to the second pan-tilt position. That is, the mechanical pan stop can be identified both as a result of the rotation of the camera suddenly stopping during a continuous movement, or by determining mathematically that there will be a pan stop in the path that the maneuverable part of the camera must traverse while moving from the first to the second pan-tilt position. Thus, the various embodiments of the invention can accommodate all conventional types of camera movements.

In one embodiment, moving the maneuverable part of the pan-tilt camera from the first pan-tilt position to the second pan-tilt position occurs automatically in response to identifying the mechanical pan stop. That is, the first pan-tilt position is the position of the mechanical pan stop. Since the move occurs automatically when the stop is reached, or when it is calculated that the stop will be reached while panning to the new position, the user does not need to be aware of any hardware limitations when using the joystick to control the camera and can control the camera as if the mechanical pan stop did not exist.

In some embodiments, the image captured by the pan-tilt camera is rotated 180 degrees by using digital image processing algorithms in response to completing the moving of the maneuverable part from the first pan-tilt position to the second pan-tilt position. This is done to compensate for the fact that the housing of the pan-tilt camera has been turned upside down while moving from the first pan-tilt position to the second pan-tilt position. As a result, the user will view a right-side-up image on his display, thus providing easier operability.

In some embodiments, the second pan-tilt position is a position specified by a user controlling the maneuverable part of the pan-tilt camera. This enables the user to seamlessly control the movement of the pan-tilt camera to a position of their choosing.

In some embodiments, the second pan-tilt position is a position predicted based on the movement of the pan-tilt camera prior to identifying the mechanical pan stop. This enables a user to follow a moving object, such as a walking person, and to be sure that the camera is directed to the proper position after an image freeze occurs in response to identifying a mechanical pan stop.

According to a second aspect, the invention relates to a computer program for moving a maneuverable part of a pan-tilt camera from a first pan-tilt position, having a first pan position and a first tilt position, to a second pan-tilt position, having a second pan position and a second tilt position. The method is characterized by the steps of:
  identifying a position of a mechanical pan stop; and
  moving the maneuverable part from the first pan position to the second pan position, by inverting the maneuverable part of the camera and panning to the second pan position, wherein the first pan position is part of a pan-tilt coordinate system and the second pan position is part of a complementary pan-tilt coordinate system representing positions of the inverted maneuverable part.

According to a third aspect, the invention relates to a digital storage medium comprising such a computer program. The computer program and the storage medium involve advantages corresponding to those of the method and may be varied similarly.

According to a fourth aspect, the invention relates to a pan-tilt camera comprising, a stationary part, a maneuverable part configured to pan in a geometric pan plane, a mechanical stop connected to the stationary part, and a processor configured to identify a position of the mechanical pan stop; and move the maneuverable part from a first pan position to a second pan position, by inverting the maneuverable part of the camera by passing a normal of the geometric pan plane, and panning to the second pan position, wherein the first pan position is part of a pan-tilt coordinate system and the second pan position is part of a complementary pan-tilt coordinate system representing positions of the inverted maneuverable part.

The details of one or more embodiments of the invention are set forth in the accompanying drawings and the description below. Other features and advantages of the invention will be apparent from the description and drawings, and from the claims.

DETAILED DESCRIPTION

As was discussed above, FIG. 1 shows a schematic view of a PTZ camera 100 having a stationary element 120 and a maneuverable element 130 to which a camera block 140 is attached. The stationary element 120 has a mechanical stop 110, which physically engages with a mechanical stop 150 on the maneuverable element 130 to limit the movement of the maneuverable element 130. The mechanical stops 110 and 130 can be, for example, simple projections from the stationary element 120 and the maneuverable element 130, respectively, which can engage with each other to stop the movement of the maneuverable element. The camera block 140 can be any type of camera suitable for PTZ camera applications, as are well known to those of ordinary skill in the art. The following description will primarily refer to the continuous movement, by way of example, since this model is intuitive and clearly illustrates the principles of the invention. However, it should be clear to a person of ordinary skill in the art that the concepts described below can be equally well applied to the other basic movement models discussed above, that is, the absolute movement model and the relative movement model, respectively.

As can be seen in FIG. 1, when the two mechanical stops 110 and 150 engage from the left and from the right, respectively, there will be a certain pan range in which the camera element 140 cannot capture any images. Typically these mechanical limitations allow the camera element 140 to have a pan range that is close to −180 degrees to +180 degrees, for example, −175 degrees to +175 degrees. The various embodiments described herein provide mechanisms for extending the range of such PTZ cameras to a 360 degree pan range (i.e., −180 degrees to +180 degrees).

Figure 2:
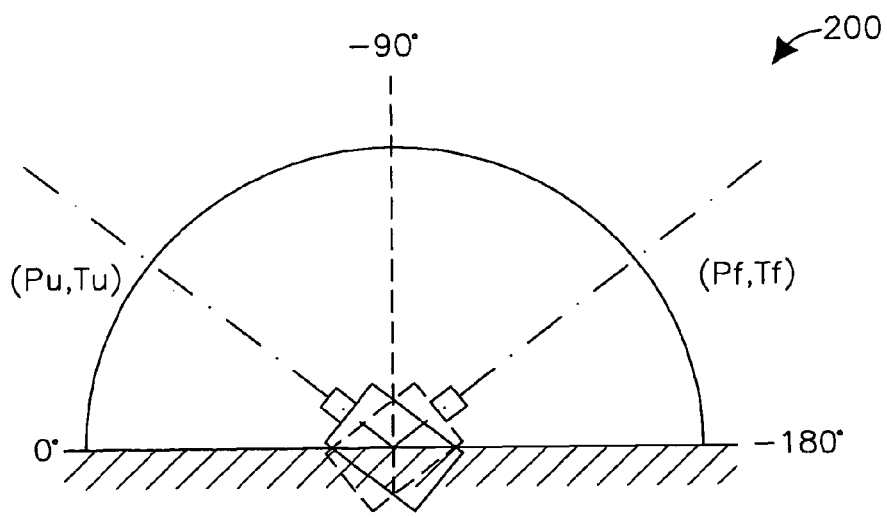
FIG. 2 is a schematic side view of a PTZ camera, illustrating the upright and complementary coordinate systems, in accordance with one embodiment of the invention.

One aspect of the solution stems from the realization that any point in the space that can be captured by the camera 100 (that is, any camera position) can be represented in two complementary ways; both in an upright coordinate system and in a flipped coordinate system. This is schematically illustrated in FIG. 2, which shows a side view of a PTZ camera. As can be seen in FIG. 2, each camera position can be described by a pan-tilt coordinate pair. In particular, a position in the normal, upright, coordinate space can be described by a pan coordinate $P_U$ (−180°≤$P_U$≤180°) and a tilt coordinate $T_U$ (−90°≤$T_U$≤0°). The same point can be described in the flipped coordinate space (i.e., after the camera passes nadir and gets turned upside down or in other terms after the maneuverable part 140 has been inverted) by a complementing pan coordinate $P_F$=(($P_U$+360)/360)−180), where −180°≤$P_F$≤180°, and a complementing tilt coordinate $T_F$=−$T_U$−180, where −180°≤$T_F$≤−90°. Having two complimentary ways of representing positions makes it possible to use either the upright pan coordinates or the flipped pan coordinates to reach all positions on a half-sphere (that is, tilt: [0°, −90°] and pan: [−180°, 180°]) using a PTZ camera, similar to what can be achieved with a conventional dome camera. The flipped coordinate space is defined as the complementary pan/tilt coordinate system to the upright coordinate space and the upright coordinate space is defined as the complementary pan/tilt coordinate system to the flipped coordinate space. As an example of the above, a pan of 90 degrees and a tilt of −45 degrees in the upright coordinate space corresponds to a pan of −90 degrees and a tilt of −135 degrees in the flipped coordinate space, whereas a pan of 0 degrees and a tilt of 0 degrees in the upright coordinate space corresponds to a pan of 180 degrees and a tilt of −180 degrees in the flipped coordinate space.

Inverting the maneuverable part 140 may also, according to one particular embodiment, be described as tilting the camera towards a pan position angled 180 degrees apart from the pan position of the maneuverable part prior to the inverting action.

Figure 3:
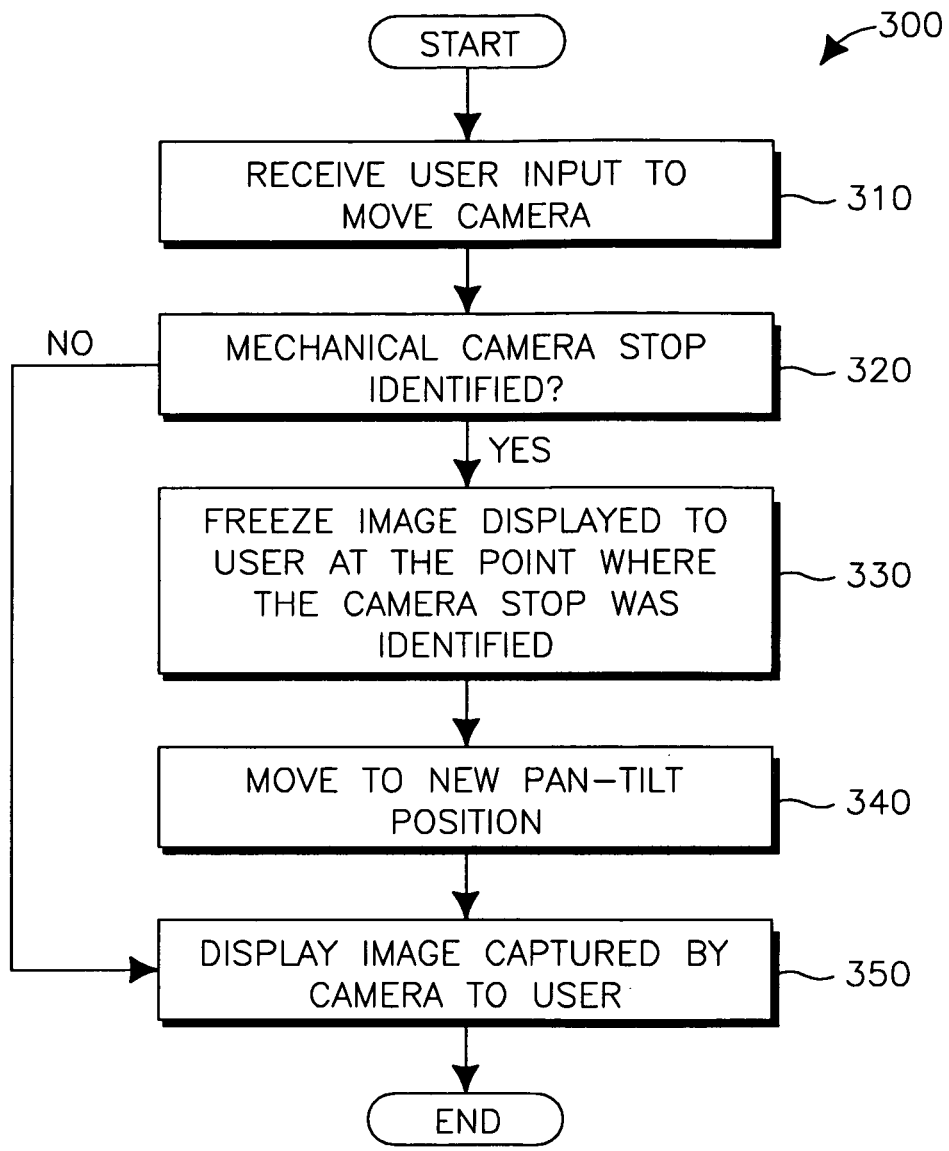
FIG. 3 is a flowchart of a method for moving a PTZ camera from a first pan-tilt position to a second pan-tilt position, in accordance with one embodiment of the invention.

In order to rotate the maneuverable element 130 freely in the pan plane, a method is needed which makes it possible to automatically move the camera from a first pan-tilt position to (or past) a second pan-tilt position, where the first position is located in the segment that is not limited by the mechanical stop 110 (for example, in the range of [−175, +175] degrees), and the second position is located in the segment that is limited by the mechanical stop 110 (for example, in the range of [−175, −180] degrees, or in the range of [+175, +180] degrees). FIG. 3 is a flowchart illustrating one example of such a method, and will now be described in detail.

As can be seen in FIG. 3, the method 300 starts by receiving user input to move the camera, step 310. The user input can be received through any conventional input devices, such as a joystick or a mouse which is operatively connected to a computer system for controlling the camera and displaying captured images to the user. As the maneuverable element 130 of the camera 100 moves in response to the received user input, the camera control system examines whether a mechanical camera stop 110 has been identified, that is, if the stop 150 on the maneuverable element 140 has engaged or will engage with the stop 110 on the stationary element 120 of the camera 100, step 320. If no stop is identified in step 320, the camera continues to display image captured by the camera to the user, step 350.

If a stop is identified in step 320, the camera freezes the image displayed to the user, step 330. The freezing of the image is due to the fact that the image data that is generated while the camera moves from the first position to the second position generally does not add any valuable information to the user. By freezing the image, the user perceives that he can freely rotate the camera in the pan plane, with the only noticeable effect being that the image is frozen during a short time period as the camera "moves" across the mechanical pan stop. The duration for the freezing is typically in the range of one half second to three seconds, depending on the top speed of the pan and tilt motors of the PTZ camera and the acceleration of the PTZ camera during the move.

Next, while the image remains frozen, the camera moves to the new pan-tilt position, step 340. How this move is accomplished will be explained in detail below with reference to FIG. 4. Finally, once the new pan-tilt position is reached, the image displayed to the user is unfrozen and a live image from the camera is displayed, step 350, which ends the process.

Figure 4:
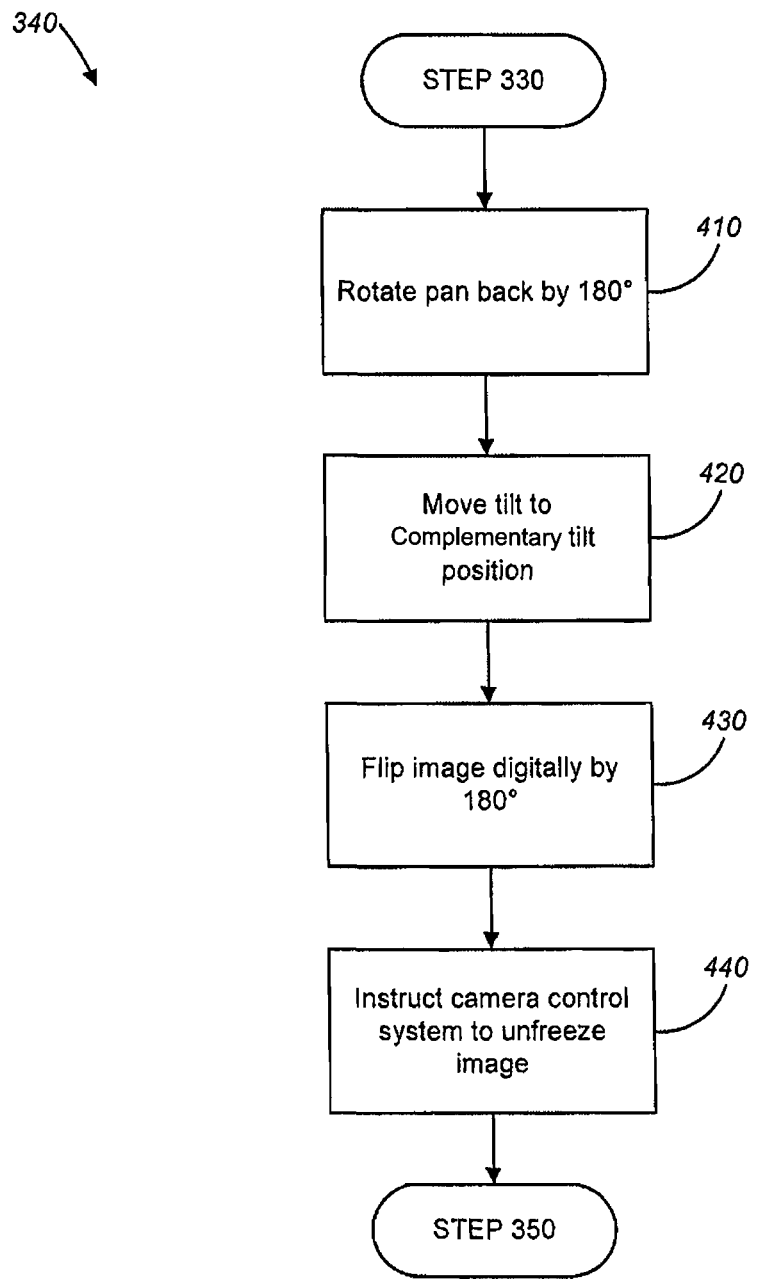
FIG. 4 is a flowchart showing a detailed view of step 340 of FIG. 3, in accordance with one embodiment of the invention.

FIG. 4 is a flowchart showing a detailed view of the step 340 of FIG. 3, in accordance with one embodiment of the invention. This process will be referred to herein as "automatic mechanical flip movement," and involves a combination of image freezing, 180° digital image flip (also referred to as "e-flip") and mechanical pan/tilt rotation which automatically triggers when reaching or being calculated to reach one of the pan endpoints (i.e. either side of the mechanical stop 110). This automatic mechanical flip movement process typically executes in 0.5-3 seconds, and will now be described. As can be seen in FIG. 4, after freezing the image on the user's display, the pan position of the camera is changed by rotating the pan position back by 180 degrees, step 410. Next, the tilt position of the camera is moved to the complimentary tilt coordinate (that is, the second tilt coordinate) step 420. After performing these mechanical moves of the camera, the captured image is digitally flipped, that is, rotated by 180 degrees, step 430. Finally, the camera control system is instructed to unfreeze the captured image, step 440, and the process returns to step 350 of FIG. 3, described above, where the user now can view an image of the new pan/tilt location.

Some embodiments of the invention also contain a pan and tilt movement prediction feature. This can be useful, for example, in the following scenario. Consider a situation in which the user of the camera is controlling the monitoring camera with a joystick to monitor a walking person. When the camera reaches one of the pan limits (e.g., −175° or +175°), the automatic mechanical flip movement process will be triggered, as described above. In order to continue tracking the walking person it is possible to predict the pan coordinate where the new movement should start when the automatic mechanical flip movement process is completed. How this is done will now be described with reference to FIG. 5.

In one embodiment, the prediction of the new pan coordinate is based on the current panning speed when detecting one of the pan limits (i.e., the mechanical stop 110). If a pan/tilt speed of 180 degrees per second is assumed, the automatic mechanical flip movement process takes about 1 second. After this second, based on the detected speed, the pan coordinate after the automatic mechanical flip movement process should be as listed in Table 1 below.

TABLE 1

| Incoming speed at pan coordinate + 175° | Automatic mechanical flip duration | Predicted new pan coordinate |
| --- | --- | --- |
| 1° | 1 s | +178° |
| 5° | 1 s | −180° |
| 10° | 1 s | −175° |
| 20° | 1 s | −165° |
| 30° | 1 s | −155° |

Figure 5:
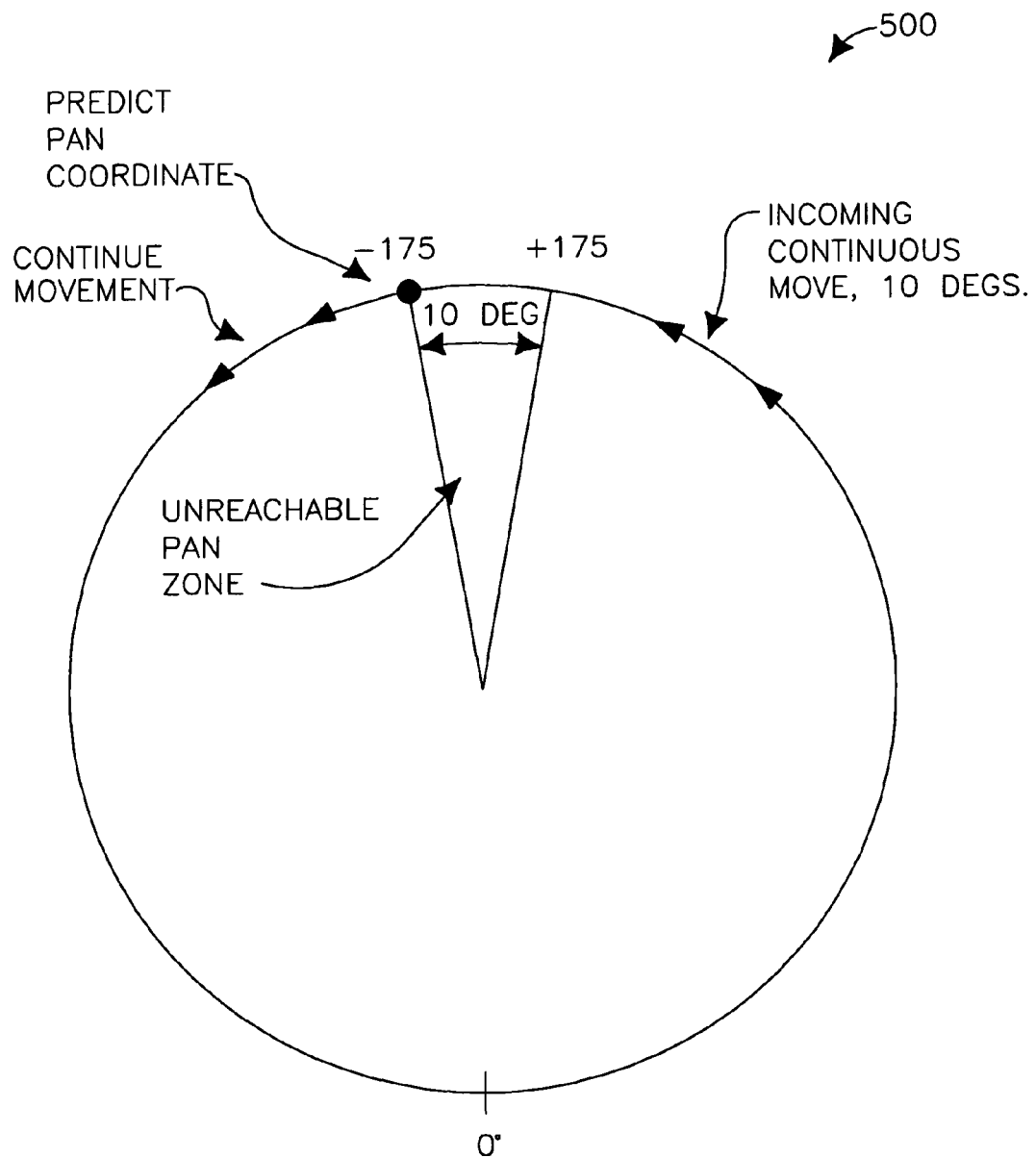
FIG. 5 shows schematically how the second pan coordinate is determined based on movement prediction in accordance with one embodiment of the invention.

FIG. 5 shows schematically the case where the incoming continuous pan move is 10 degrees per second, leading to a predicted pan coordinate of −175 degrees, as detailed in Table 1.

It should be noted that while the processes described above with reference to FIGS. 3-5 have been described primarily with respect to the continuous movement model, the processes support all the basic movement models, that is, the absolute movement model, the relative movement model, and the continuous movement model, respectively. In the absolute movement model, the PTZ camera can move either the most direct way or the longer way to the new coordinate position. In the relative movement model, a system for controlling the camera determines whether the new coordinate position will require an automatic mechanical flip movement process, and triggers this process automatically, if required. In the continuous movement model, the automatic mechanical flip movement process occurs automatically when the mechanical pan stop is encountered, as exemplified above. In summary, irrespective of which movement model is employed by the camera, the user perceives the PTZ camera as exhibiting a dome camera-like behavior.

It should also be noticed that while the pan limits (e.g., −175° or +175°) have been discussed with respect to an upright coordinate system, corresponding pan limits also exist in the flipped coordinate system (e.g., −5 or +5°). Whereas this may be insignificant to a user of the camera system, it is important for the system to be aware of this pan limitation information. This results in that during a continuous pan rotation, the camera system will carry out two automatic mechanical flip processes for each 360 degree rotation.

The various embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The various embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments of the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the various embodiments of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described. Nevertheless, it will be understood that various modifications may be made without departing from the spirit and scope of the invention. For example, the image captured by the camera does not have to be frozen while the camera moves from the first pan-tilt position to the second pan-tilt position. The automatic mechanical flip movement and the pan and tilt movement prediction can, of course, be enabled or disabled based on the user's preferences, if desired, so that the camera functions as a conventional PTZ camera. The movement prediction described above was based on a linear, constant, movement before detecting the mechanical pan stop. However, other algorithms can take into account accelerations, decelerations, and so on. Furthermore, while the above description and calculations are accurate from a theoretical point of view, the quality of the physical components of various PTZ cameras may vary and cause possible pan/tilt and/or optical misalignments and offsets, which can cause the upright and complementary representations of a given position to be slightly different. The control of the camera has been described above in terms of a user controlling the camera. However, it should be realized that the user does not have to be a physical person directly controlling the camera. The camera can also be controlled by a system, which receives instructions from a user, either in real time, or which has been pre-programmed by a user at some earlier point in time. Consequently, further adjustments may be necessary in some cases when determining coordinate positions. Accordingly, other embodiments are within the scope of the following claims.

What is claimed is:

1. A method implemented in a pan-tilt camera for achieving a 360 degree continuous panning capability by moving a maneuverable part of the pan-tilt camera from a first pan-tilt position, having a first pan position and a first tilt position, to a second pan-tilt position, having a second pan position and a second tilt position, the maneuverable part being configured to pan in a geometric pan plane, comprising:
   receiving an input to move the pan-tilt camera;
   identifying a position of a mechanical pan stop;
   determining whether the position of the mechanical pan stop would be located in a path to be used by the maneuverable part of the pan-tilt camera when moving from the first pan-tilt position to the second pan-tilt position; and if so,
   moving the maneuverable part from the first pan position to the second pan position, by inverting the maneuverable part of the camera by tilting the maneuverable part passing a normal of said geometric pan plane, and panning to the second pan position, wherein the first pan position is part of a pan-tilt coordinate system and the second pan position is part of a complementary pan-tilt coordinate system representing positions of the inverted maneuverable part.

2. A method as claimed in claim 1, further comprising moving the maneuverable part from the first tilt position to the second tilt position.

3. A method according to claim 1, wherein the inverting comprises passing the normal of the geometric pan plane once.

4. A method as claimed in claim 2, wherein the moving of the maneuverable part from the first pan position and the first tilt position to the second pan position and the moving of the maneuverable part from the first tilt position to the second tilt position are performed substantially simultaneous.

5. A method as claimed in claim 1, further comprising:
   capturing an image by the pan-tilt camera;
   freezing the image while moving the maneuverable part from the first pan-tilt position to the second pan-tilt position; and
   unfreezing the image in response to reaching the second pan-tilt position.

6. A method as claimed in claim 5, wherein moving the maneuverable part of the pan-tilt camera from the first pan-tilt position to the second pan-tilt position occurs automatically in response to identifying the mechanical pan stop.

7. A method as claimed in claim 1, wherein:
   the first pan-tilt position is the position of the identified mechanical pan stop; and
   identifying the position of the mechanical pan stop includes physically encountering the mechanical pan stop during a continuous movement of the maneuverable part of the pan-tilt camera.

8. A method as claimed in claim 1, further comprising:
   rotating the image captured by the pan-tilt camera 180 degrees by using digital image processing algorithms in response to completing the moving of the maneuverable part from the first pan-tilt position to the second pan-tilt position.

9. A method as claimed in claim 1, wherein the second pan-tilt position is a position specified by a user controlling the maneuverable part of the pan-tilt camera.

10. A method as claimed in claim 1, wherein the second pan-tilt position is a position predicted based on the movement of the pan-tilt camera prior to identifying the mechanical pan stop.

11. A method as claimed in claim 10, wherein:
the second pan coordinate is determined based on a pan speed of the maneuverable part prior to identifying the mechanical pan stop and an estimated time for moving the maneuverable part from the first pan-tilt position to the second pan-tilt position; and
the second tilt coordinate is determined based on a tilt speed of the maneuverable part prior to identifying the mechanical pan stop and an estimated time for moving the maneuverable part from the first pan-tilt position to the second pan-tilt position.

12. A non-transitory computer-readable medium having instructions for causing a computer to execute a method comprising:
moving a maneuverable part of a pan-tilt camera from a first pan-tilt position, having a first pan position and a first tilt position, to a second pan-tilt position, having a second pan position and a second tilt position, the maneuverable part being configured to pan in a geometric pan plane and provide a 360 degree continuous panning capability, wherein the computer-readable medium contains instructions corresponding to the steps of:
receiving an input to move the pan-tilt camera; identifying a position of a mechanical pan stop;
determining whether the position of the mechanical pan stop would be located in a path to be used by the maneuverable part of the pan-tilt camera when moving from the first pan-tilt position to the second pan-tilt position; and if so,
moving the maneuverable part from the first pan coordinate to the second pan position, by inverting the maneuverable part of the camera by tilting the maneuverable part passing a normal of said geometric pan plane, and panning to the second pan position, wherein the first pan position is part of a pan-tilt coordinate system and the second pan coordinate is part of a complementary pan-tilt coordinate system representing positions of the inverted maneuverable part.

13. A non-transitory computer-readable medium as claimed in claim 12, further having instructions for causing a computer to execute a method comprising moving the maneuverable part from the first tilt coordinate to the second tilt coordinate.

14. A non-transitory computer-readable medium as claimed in claim 12, wherein the moving of the maneuverable part from the first pan position and the first tilt position to the second pan position and the moving of the maneuverable part from the first tilt position to the second tilt position are performed substantially simultaneous.

15. A non-transitory computer-readable medium as claimed in claim 12, further having instructions for causing a computer to execute a method comprising:
capturing an image by the pan-tilt camera;
freezing the image while moving the maneuverable part from the first pan-tilt position to the second pan-tilt position; and
unfreezing the image in response to reaching the second pan-tilt position.

16. A non-transitory computer-readable medium as claimed in claim 12, wherein:
the first pan-tilt position is the position of the identified mechanical pan stop; and
identifying the position of the mechanical pan stop includes physically encountering the mechanical pan stop during a continuous movement of the maneuverable part of the pan-tilt camera.

17. A non-transitory computer-readable medium as claimed in claim 16, wherein moving the maneuverable part of the pan-tilt camera from the first pan-tilt position to the second pan-tilt position occurs automatically in response to identifying the mechanical pan stop.

18. A non-transitory computer-readable medium as claimed in claim 12, further having instructions for causing a computer to execute a method comprising:
rotating the image captured by the pan-tilt camera 180 degrees by using digital image processing algorithms in response to completing the moving of the maneuverable part from the first pan-tilt position to the second pan-tilt position.

19. A non-transitory computer-readable medium as claimed in claim 12, wherein the second pan-tilt position is a position specified by a user controlling the maneuverable part of the pan-tilt camera.

20. A non-transitory computer-readable medium as claimed in claim 12, wherein the second pan-tilt position is a position predicted based on the movement of the pan-tilt camera prior to identifying the mechanical pan stop.

21. A non-transitory computer-readable medium as claimed in claim 20, wherein:
the second pan coordinate is determined based on a pan speed of the maneuverable part prior to identifying the mechanical pan stop and an estimated time for moving the maneuverable part from the first pan-tilt position to the second pan-tilt position; and
the second tilt coordinate is determined based on a tilt speed of the maneuverable part prior to identifying the mechanical pan stop and an estimated time for moving the maneuverable part from the first pan-tilt position to the second pan-tilt position.

22. A non-transitory computer-readable medium as claimed in claim 12, wherein the medium is a digital storage medium.

23. A pan-tilt camera comprising
a stationary part,
a maneuverable part configured to pan in a geometric pan plane and provide a 360 degree continuous panning capability,
a mechanical stop connected to the stationary part,
a processor configured to receive an input to move the pan-tilt camera; to identify a position of the mechanical pan stop; to determine whether the position of the mechanical pan stop would be located in a path to be used by the maneuverable part of the pan-tilt camera when moving from the first pan-tilt position to the second pan-tilt position; and if so, to move the maneuverable part from a first pan position to a second pan position, by inverting the maneuverable part of the camera by tilting the maneuverable part passing a normal of said geometric pan plane, and panning to the second pan position, wherein the first pan position is part of a pan-tilt coordinate system and the second pan position is part of a complementary pan-tilt coordinate system representing positions of the inverted maneuverable part.

* * * * *